United States Patent Office 3,478,481
Patented Nov. 18, 1969

3,478,481
REINFORCED CONCRETE MODULE JOINT
Werner Heierli, Buchzelgstrasse 15, Zurich, Switzerland, and Armin Schuppisser, Geerlisbergstrasse 450, Bassersdorf, Switzerland
Filed May 8, 1967, Ser. No. 636,779
Claims priority, application Switzerland, May 10, 1966, 6,779/66; Sept. 20, 1966, 13,549/66
Int. Cl. E04c 5/20, 1/41
U.S. Cl. 52—432                    2 Claims

ABSTRACT OF THE DISCLOSURE

The present invention relates to connections between prefabricated reinforced concrete building components, the connections being provided by welding together parts of metal reinforcements projecting from the building components or welding the projecting reinforcement parts to a metal connection part.

---

The present invention relates to connections between prefabricated reinforced concrete building components.

It is an object of the invention to provide a connection between prefabricated reinforced concrete building components which can be made on a building site in any weather, even at low temperatures, in a simple manner and in a short time and which either satisfactorily transmits all forces acting thereon (normal forces, transverse forces and moments) and has approximately the same strength as the building components themselves, or which can deform on shrinkage of the concrete and on contraction thereof in response to temperature falls so that the concrete does not fracture. Preferably, at least the essential parts of the connection should be able to be made even when the connection gap is accessible from only one side. Moreover, the connection should preferably be water-tight.

According to the invention, the building components have, at their faces extending along a connection gap, metal parts which are parts of the reinforcements or connected thereto, and these metal parts of adjacent building components are welded directly together or are connected together by at least one connection part welded thereto.

To make the invention more readily understood an embodiment thereof is described below, by way of example, with reference to the accompanying drawings, wherein.

Figure 1:
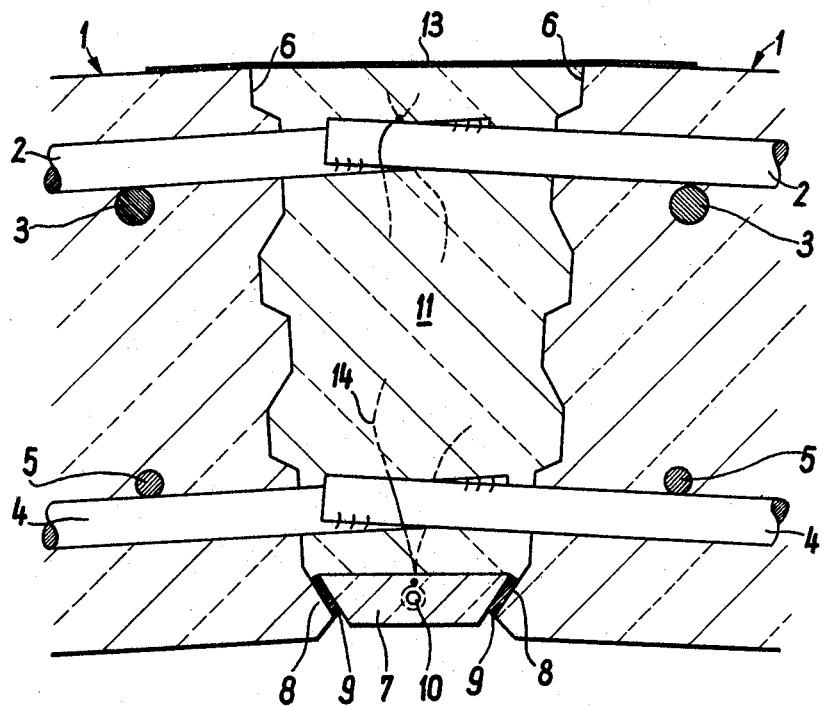
FIG. 1 shows a transverse section through a connection capable of transmitting longitudinal and transverse forces and moments between two prefabricated reinforced concrete building components.

In FIG. 1, each of two prefabricated reinforced concrete slabs, which are only partially illustrated, are indicated by reference numeral 1 and their reinforcement rods are indicated by reference numerals 2, 3, 4 and 5. Only one of each of these rods is illustrated. The rods 2 and 4 project from profiled faces 6, extending along the connection gap, of the slabs 1. The rods 2 are welded together and the rods 4 are also welded together. The bottom of the gap is colsed by a fillet 7 which is supported on projections 8 at the lower ends of the faces 6, sealing material 9 being arranged between the projections 8 and the fillets 7. The fillet 7 is made of concrete and, for improving its strength to facilitate transport thereof, may be provided with reinforcement 10, which is preferably rust resistant. The gap is filled with a filling 11, e.g. mortar, fine concrete, concrete, gravel embedded in mortar (prepacked-concrete), or preferably with sprayed concrete, a toothed engagement of the filling 11 with the building components 1 being provided by the profiling of the faces 6. The top of the gap and the adjacent concrete surfaces are covered with water-tight material 13.

Figure 7:
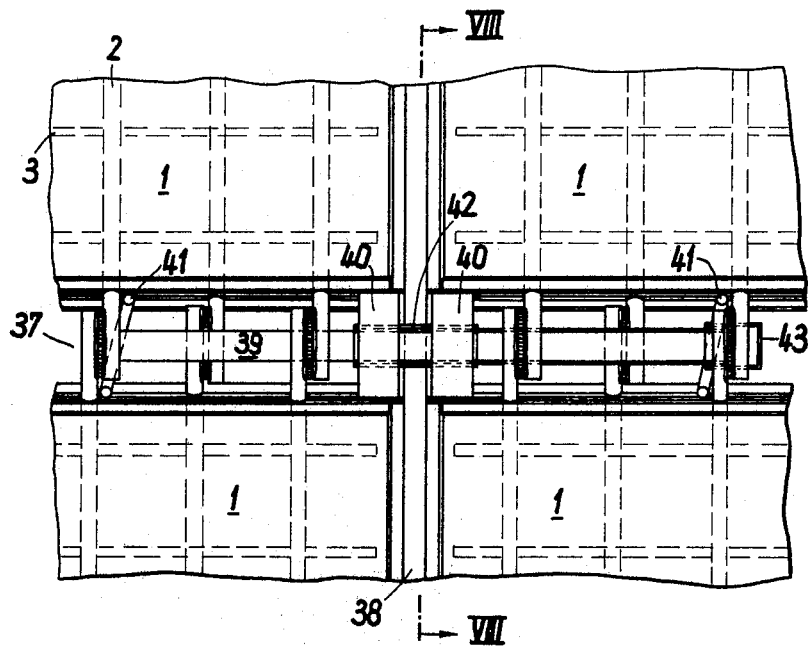
FIG. 7 shows a gap as shown in FIG. 1 crossing an expansion gap.
Figure 8:
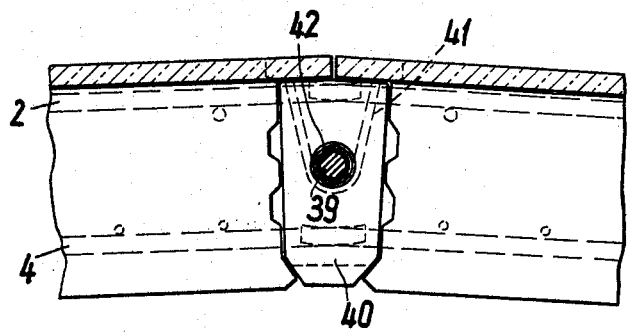
FIG. 8 shows a section along the line VIII—VIII of FIG. 7.

For making this connection the slabs 1 are arranged on an assembly frame in such a way that the reinforcement rods 2 and the reinforcement rods 4 bear against one another. The fillet 7 is previously suspended from the ends of reinforcement rods of one of the building components 1 by means of a nylon cord 14. The sealing material 9 is applied either to the fillet 7 or to the projections 8. The reinforcement rods 2 and the reinforcement rods 4 are welded together from above. The cord 14 suspending the fillet 7 is then cut so that the fillet falls, whereby its inclined side edges usually fall into the correct position and can if required be moved into the correct position. The gap, which is sealed at its sides either permanently (e.g. by plates 40 as shown in FIGS. 7 and 8) or temporarily, is then filled from above. All the steps in the making of the connection between the prefabricated building components 1 can thus be carried out from above. The assembly frame can be removed as soon as the welding is completed, since the connection is then already self-supporting and can sustain the loads (caused e.g. by workmen, snow or wind) which occur during further building operations.

In FIG. 1 it is for example assumed that the two slabs 1 are elements of an elongate joint which is an arch with an approximately horizontal axis. The slabs are therefore inclined to one another.

The slabs could also be elements of a different structure, e.g. flat, curved, horizontal, inclined or vertical wall, which during building operations needs to be accessible at only one side.

The rods 2, 3 and 4, 5 form mats which can be connected together within the slabs 1 by reinforcement rods welded thereto. To improve the strength of the connection before the gap is filled, to anchor the connection portions of the reinforcement rods and to take up bending forces, when the slabs are connected together at an angle, connection rods can be welded in the gap between the rods 2 and 4, or alternatively connection plates, which are preferably perforated, can be welded at one side to one of the rods 2 and 4 and at the other side to the other of the rods 2 and 4.

When rectangular slabs having reinforcement rods extending parallel to the sides thereof, and having equal spacings from the edges in adjacent slabs, are connected together as shown in FIG. 1, their sides extending parallel to the plane of FIG. 1 need not be in alignment but can be relatively offset by the width of the reinforcement rods 2 and 4 so that these rods lie one behind the other in the direction perpendicular to the plane of FIG. 1.

For connecting together similar slabs with similarly arranged reinforcement with their edges at right angles to the connection gap being disposed in alignment, the reinforcement rods 2 and 4 are arranged inclined relative to the sides of the slabs so as to bear against one another when the slabs are arranged in alignment. For this purpose the mats, comprising rods crossing one another at right angles, can be twisted in their own planes through the required angle relative to the sides of the slabs, or only the rods 2 and 4 which are to be welded together can be twisted through this angle, as shown in FIG. 7, in which parts which are the same as those of FIG. 1 are indicated by the same reference numerals. In the latter case, the mats are slightly obliquely-angled. The axis of the twisting can be parallel to, or inclined to, the slab faces. It is not necessary that the axis and/or the direction of twisting should be the same for all rods or for all rods projecting from the same face. For non-quadratic slabs connected together at all sides in this way, the network is obliquely-angled in accordance with the ratio of the side lengths. The reinforcement rods can be arranged within the concrete of the slabs parallel to the slab sides and bent through the required angle only at the ends thereof. The angle is in each case greater when the above-mentioned connection plates are welded between the ends of the reinforcement rods.

Instead of being welded together side by side, the reinforcement rods 2 and 4 may be welded together at their end faces, the slabs being connected together in alignment with one another without the above-described special arrangement of the mats.

Figure 2:
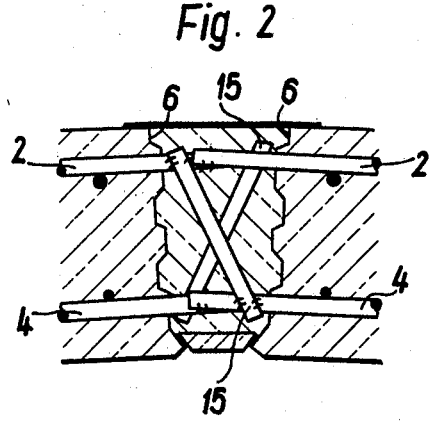
FIG. 2 shows a modification of the connection of FIG. 1.

To improve the transmission of transverse forces prior to filling of the gap in the connection shown in FIG. 1, spaced reinforcement rods in the gap can be connected together by inclined transverse struts welded thereto. These transverse struts may be disposed in the common plane of two reinforcement mats which are connected together and/or may be arranged at right angles or at an inclination to the planes of parallel reinforcement mats. When arranged at an inclination to the mat planes, the upper and lower reinforcement rods can be offset relative to one another. FIG. 2 shows a connection in which the transverse struts are indicated by reference numerals 15.

Figure 3:
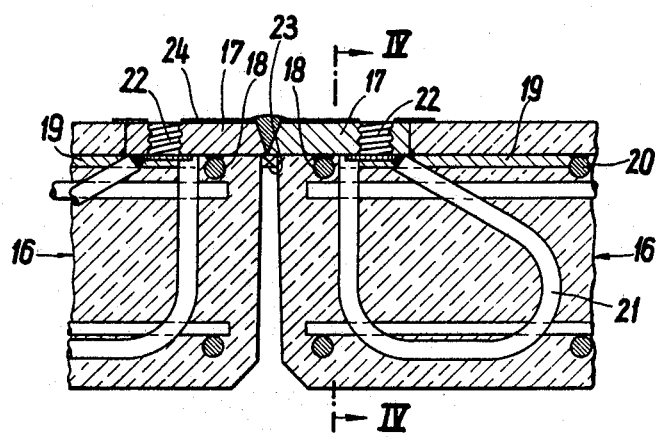
FIG. 3 shows a transverse section through a different connection.
Figure 4:
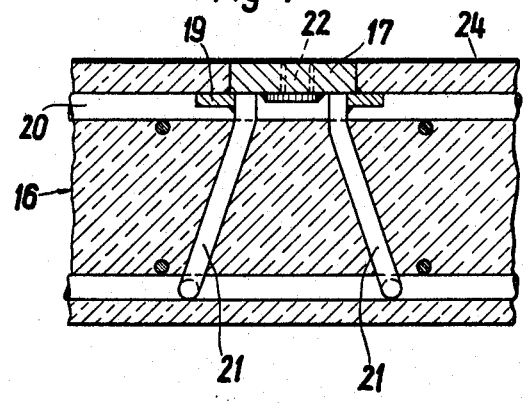
FIG. 4 shows a section taken along the line IV—IV of FIG. 3.

FIGS. 3 and 4 show a connection of reinforced concrete slabs 16 by means of plates 17 which are inset almost adjacent one another in the upper surfaces of the reinforced concrete slabs so that they project slightly at the connection gap. Each plate 17 is welded to a reinforcement rod 18, connected by a connection plate 19 embedded in the concrete of one of the slabs 16 to a similar reinforcement rod 20, and anchored in the concrete by an iron bow 21, which may be welded to the corresponding reinforcement mat. The plates 17 are bevelled along their edges which are to be welded together so as to provide a V-shaped weld seam. Assembly is facilitated by providing in the slabs 16 threaded openings 22 into which eye- or hook-bolts can be screwed for transport purposes, and in particular to enable the slabs to be brought to the required positions on the assembly frame by means of a crane. When the slabs are placed together, a rust preventor 23 is applied to the underneath of the projecting part of each plate 17. After the formation of the V-shaped weld, the plates are covered on the exterior by a rust prevention coating 24 which covers all exposed surfaces of the plates and the adjacent portions of the concrete. The plates have a dimension, measured longitudinally of the gap, such that the weld is sufficiently long and strong if the plates are offset relative to one another in this direction because of inaccuracies occurring during assembly. In an arch-shape decking composed of reinforced concrete slabs, the form of gap shown in FIGS. 3 and 4, which extends at right angles to the curvature axis (or in prismatic joints at right angles to the prism axis) is suitable. The plates 17 may be flat even if the slabs are curved.

Figure 5:
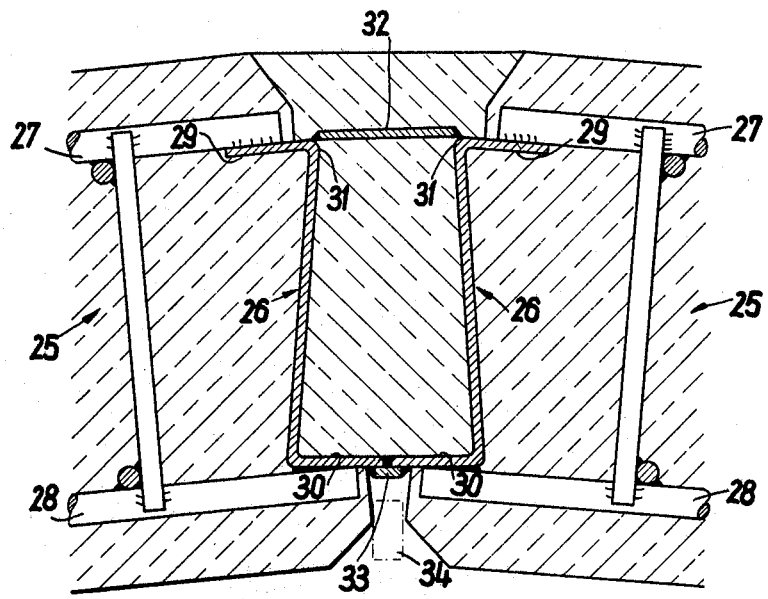
FIG. 5 shows a transverse section through a further connection.

FIG. 5 shows two reinforced concrete slabs 25 provided along their faces extending along the connection gap with Z-shaped plates 26. Rods 27 and 28 of the reinforcement mats of the slabs 25 extending transverse to the gap are welded to flanges 29 and 30 of the plates 26. Each plate 26 extends over the whole length of the corresponding face and covers a part thereof. The plates 26 at the connection are at least approximately symmetrical relative to one another. The ends of flanges 30 of the plates 26 facing one another lie close together and are welded together. The bends 31 of other flanges 29 of the plates 26 have a greater spacing from one another and are welded to a connection plate 32. The space between the plates 26 and the space above the connection plate 32 are filled with a filler material. A weld support is indicated by reference numeral 33, and reference numeral 34 indicates a wooden spacer which during the making of the connection maintains a predetermined spacing between the slabs 33. All of the steps required for making this connection, with the exception of the provision of a rust inhibitor on the weld support 33, can be carried out from above.

Figure 6:
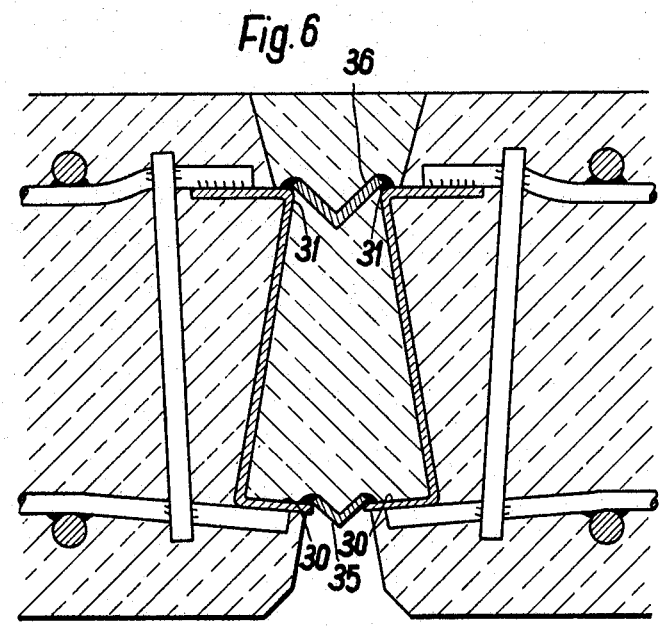
FIG. 6 shows a modification of the connection of FIG. 5.

To make this connection flexible so that it can be deformed during shrinkage of the concrete and contraction thereof in response to temperature decreases, so that the concrete does not fracture at the parts adjoining the connection, the ends of the flanges 30 may be welded as shown in FIG. 6 to the longitudinal edges of a channel-section or V-shaped connection plate 35, and the ends 31 can likewise be connected together by a similarly shaped connection plate 36.

FIG. 7 shows a part of a plan of an elongate joint which is similar to an arch. This figure shows parts of four reinforced concrete slabs 1 placed together. A longitudinal gap 37 is formed as shown in FIG. 1 and extends parallel to the axis of the arch. A transverse gap 38 is provided as an expansion gap. The gap 37 is shown without any filling material. At the illustrated intersection of the gaps a rod 39 of reinforcing material is arranged in opposed ends of sections of the gap 37.

These sections are closed by prefabricated concrete slabs 40 which each have an opening for the rod 39. In the sections of the gap 37 the rod 39 is suspended in U-shaped rods 41, the upper ends of which are welded to the reinforcement of the building components. The middle part of the rod 39 is disposed in a rust-preventing sleeve 42 which extends into the slabs 40 and the space between the slabs 40. The right-hand half of the rod 39, as viewed in FIG. 7, is coated with bitumen and its free end is disposed in a cap 43, the end surface of the rod 39 being spaced from the bottom of the cap. In this way this half of the rod 39, which is embedded at both sides of the plates 40 in the filling material (not shown) of the gap 37, is longitudinally displaceable by an amount required to provide an expansion gap. At right angles thereto, the connection is held against shifting by the rod 39.

The welds of the above described connections are suitably formed as slightly arched welds, preferably with the help of a protective gas, or as resistance welds.

We claim:
1. A reinforced concrete assembly comprising
   prefabricated concrete building components,
   faces on said components defining between said faces a connection gap,
   metal structures forming parts of said components,
   first parts of said metal structures being embedded in the concrete of said components,
   second parts of said metal structures protruding from said faces into said connection gap,
   weld means connecting together said second parts of said metal structures,
   means forming protrusion on said faces on at least one longitudinal side of said connection gap,
   fillet means supported on said protrusion means and substantially closing the connection gap at said longitudinal side,
   filling material filling the connection gap,
   and two reinforcement mats provided in each of said prefabricated concrete components and forming said first parts of said metal structures,
   at least two Z-shaped metal plates forming said second parts of said metal structures and disposed substantially symmetrically with respect to one another, said Z-shaped metal plates each forming a part of one of said faces, flanges of said Z-shaped metal plates each being welded to one of said mats of the respective prefabricated concrete element, opposite flanges and said Z-shaped plates forming said protrusion forming means, and a metal sheet forming said fillet means and welded to said opposite flanges, means welded to and connecting together opposite bends of said Z-shaped plates.

2. A reinforced concrete assembly as claimed in claim 1, and further comprising two reinforcement mats provided in each of said prefabricated concrete components and forming said first parts of said metal structures;

at least two Z-shaped metal plates forming said second parts of said metal structures and disposed substantially symmetrically with respect to one another, said Z-shaped metal plates each forming a part of said faces, flanges of said Z-shaped metal plates each being welded to one of said reinforcement mats of the respective prefabricated concrete element, said protrusions forming means comprising opposite flanges of said Z-shaped plates, a first channel-shaped metal plate forming said fillet means, and a second channel-shaped metal plate each of the flanges of which is welded to one of the opposite bends of said Z-shaped metal plates.

References Cited

UNITED STATES PATENTS

| | | | |
|---|---|---|---|
| 1,362,069 | 12/1920 | Witzel | 52—125 |
| 1,463,621 | 7/1923 | Lichtenberg | 52—125 |
| 1,796,048 | 3/1931 | Robinson | 52—601 |
| 2,042,524 | 6/1936 | Hall | 94—18 |
| 2,157,271 | 5/1939 | Schmeller | 52—432 |
| 2,372,200 | 3/1945 | Hayes | 52—432 |
| 2,705,886 | 4/1955 | Annett | 52—601 |

FOREIGN PATENTS

| | | |
|---|---|---|
| 620,312 | 1/1927 | France. |
| 993,545 | 7/1951 | France. |
| 149,732 | 1920 | Great Britain. |
| 347,945 | 5/1931 | Great Britain. |
| 376,308 | 7/1932 | Great Britain. |

OTHER REFERENCES

Engineering News Record, June 23, 1960, page 32, copy in Group 350.

HENRY C. SUTHERLAND, Primary Examiner

U.S. Cl. X.R.

52—441, 587